(12) United States Patent
Puglia

(10) Patent No.: US 6,639,543 B2
(45) Date of Patent: Oct. 28, 2003

(54) SENSOR FRONT-END FOR VEHICLE CLOSING VELOCITY SENSOR

(75) Inventor: Kenneth V. Puglia, Westford, MA (US)

(73) Assignee: Tyco Electronics Corp., Middletown, PA (US)

(*) Notice: Subject to any disclaimer, the term of this patent is extended or adjusted under 35 U.S.C. 154(b) by 46 days.

(21) Appl. No.: 10/042,613

(22) Filed: Jan. 9, 2002

(65) Prior Publication Data
US 2003/0128152 A1 Jul. 10, 2003

(51) Int. Cl.[7] ............................................. G01S 13/93
(52) U.S. Cl. .................... 342/70; 342/85; 342/131; 342/134; 342/135; 342/194
(58) Field of Search ............... 342/70, 85, 118, 342/131, 134, 135, 194

(56) References Cited

U.S. PATENT DOCUMENTS

| | | | | | |
|---|---|---|---|---|---|
| 3,713,154 | A | * | 1/1973 | Kummer | 342/107 |
| 3,739,379 | A | | 6/1973 | Davis | 342/88 |
| 3,889,261 | A | * | 6/1975 | Sirven | 342/127 |
| 3,952,302 | A | * | 4/1976 | Mullins | 342/161 |
| 4,160,248 | A | * | 7/1979 | Hubka et al. | 342/115 |
| 4,740,045 | A | * | 4/1988 | Goodson et al. | 342/112 |
| 5,079,556 | A | * | 1/1992 | Itoh | 342/109 |
| 5,191,347 | A | * | 3/1993 | Ishikawa et al. | 342/132 |
| 5,521,600 | A | * | 5/1996 | McEwan | 342/27 |
| 6,404,381 | B1 | * | 6/2002 | Heide et al. | 342/109 |
| 6,573,859 | B2 | * | 6/2003 | Tokoro | 342/70 |
| 6,577,269 | B2 | * | 6/2003 | Woodington et al. | 342/196 |
| 6,577,270 | B2 | * | 6/2003 | Kanechika et al. | 342/199 |
| 2003/0100285 | A1 | * | 5/2003 | Puglia | 455/293 |

FOREIGN PATENT DOCUMENTS

| | | | |
|---|---|---|---|
| EP | 0 940 690 A2 | 9/1999 | G01S/13/56 |
| WO | WO 00/77542 A1 | 12/2000 | G01S/13/18 |

OTHER PUBLICATIONS

International Search Report, International Application No. PCT/US02/39795, International filing date Dec. 12, 2002.

* cited by examiner

Primary Examiner—John B. Sotomayor (57) ABSTRACT

A sensor front end is disclosed that is able to discriminate objects based on their range from the sensor. The sensor includes an antenna that transmits a sensor signal and, if an object is present receives a reflected signal therefrom. A pulsed oscillator provides a pulsed first signal having a first frequency and phase, and wherein the pulsed oscillator provides the pulsed first signal for a predetermined pulse duration and with a predetermined pulse repetition frequency. The pulsed oscillator provides the pulsed first signal to a first input port of a dual mode mixer that is further coupled to the antenna via a second port. The dual mode mixer transmits a portion of the pulsed first signal from the first input port to the second port and thus to the antenna to be transmitted as the sensor signal. In addition, the dual mode mixer uses a portion of the first signal to mix with the received reflected signal. The dual mode mixer then provides a mixed signal as an output at a third port. Thus, the pulsed first signal provides both the signal to be transmitted as the sensor signal and the local oscillator signal for the mixer as well. The dual mode mixer will only provide a mixed signal output if the received reflected signal is present in the dual mode mixer concurrently with the pulsed first signal. Accordingly, an object can only be detected when the range to the object is such that the signal propagation time to and from the object is less than or equal to the predetermined pulse length of the pulsed first signal.

16 Claims, 7 Drawing Sheets

SENSOR FRONT-END FOR VEHICLE CLOSING VELOCITY SENSOR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Proximity sensors of various types are used in a variety of applications in which the distance to an object and, in some circumstances, the velocity of that object relative to the sensor are to be determined. This data can be provided to a processing system that analyzes the received data and determines if a safety threshold has been exceeded. If a safety threshold has been exceeded, the processor can determine if an alarm is to be set or other action taken. Proximity sensors are used, for example, in a variety of applications that can include burglar alarms, obstacle detection, and automobiles. Proximity sensors in automobiles can be used to determine the relative position and relative velocity of other automobiles or objects in the vicinity of the automobile. In an automobile system this position and velocity data may be used, for example, to adjust the velocity of the automobile while operating under cruise control, to apply a portion of the available brake energy to slow the vehicle down, or to provide an auditory or visual alarm indication to the driver.

One of the problems associated with the proximity and velocity sensors used in the systems described above is the detection of objects that are beyond a specified range and which may cause false alarms to be registered. In particular in an automobile system, the inability to discriminate objects based on range may result in a sudden application of brakes, the adjustment of speed in a cruise control system, or other sudden acceleration or deceleration of the automobile in response to the false alarm.

In addition to needing to be able to discriminate objects based on range, the sensors used in automobiles must be physically small, light weight, highly reliable, and low cost. The system requirement for these sensors are often quite stringent both in terms of the technical performance of the sensor and in the physical and economic factors as well. The more complex the sensor, the larger the parts count, and concomitantly, the higher the cost, the higher the mass, the larger the physical volume of the sensor, and the lower the reliability of the sensor.

Therefore, in would be advantageous to provide a sensor system, which is able to discriminate objects that are within a specified range, from objects that are outside of this range that meet the physical and economic requirements and is reliable.

BRIEF SUMMARY OF THE INVENTION

A sensor is disclosed that is able to discriminate objects based on their range from the sensor. The sensor includes an antenna that transmits a sensor signal and, if an object is present receives a reflected signal therefrom. A pulsed oscillator provides a pulsed first signal having a first frequency and phase, and wherein the pulsed oscillator provides the pulsed first signal for a predetermined pulse duration and with a predetermined pulse repetition frequency. The pulsed oscillator provides the pulsed first signal to a first input port of a dual mode mixer that is further coupled to the antenna via a second port. The dual mode mixer transmits a portion of the pulsed first signal from the first input port to the second port and thus to the antenna to be transmitted as the sensor signal. In addition, the dual mode mixer uses a portion of the first signal to mix with the received reflected signal and provides a mixed signal as an output at a third port. Thus, the pulsed first signal provides both the signal to be transmitted as the sensor signal and the local oscillator signal for the mixer as well. The dual mode mixer provides a mixed signal output if the received reflected signal is present in the dual mode mixer concurrently with the pulsed first signal. Accordingly, an object can only be detected when the range to the object is such that the signal propagation time to and from the object is less than or equal to the predetermined pulse length of the pulsed first signal.

In addition, a phase shifter may be inserted in series between the second port of the dual mode mixer and the antenna. The phase shifter has a first phase shifter port and receives the portion of the first signal transmitted between the first port and the second port of the dual mode mixer. The phase shifter may selectively shift the phase of the transmitted portion of the first signal received from the dual mode mixer. The transmitted phase shifted first signal is provided as an output from a second phase shifter port of the phase shifter to the antenna. The antenna receives the transmitted phase shifted first signal and transmits it as the sensor signal. In the event that the object is present, the antenna receives the reflected signal that is reflected therefrom. The antenna provides the received reflected signal to the second phase shifter port of the phase shifter. The phase shifter may selectively shift the phase of the received reflected signal and provide a phase shifted reflected signal as an output from the first phase shifter port. The dual mode mixer receives the phase shifted reflected signal at the second port, wherein the dual mode mixer is configured and arranged to mix the phase shifted reflected signal with the pulsed first signal provided by the pulsed signal source. In this manner, signals may be shifted in phase such that two sensor signals and their respective reflected signal returns are orthogonal to one another, i.e., the two signals are ninety degrees out of phase with one another. Accordingly, in-phase and quadrature-phase signal components may be provided to enhance the accuracy and functionality of the sensor.

Other forms, features and aspects of the above-described methods and system are described in the detailed description that follows.

BRIEF DESCRIPTION OF THE DRAWINGS

The invention will be more fully understood from the following detailed description taken in conjunction with the accompanying drawings in which.

DETAILED DESCRIPTION OF THE INVENTION

A sensor front end is disclosed that is able to discriminate between objects within a specified range and objects outside of that specified range and that has a reduced number of parts when compared to current sensors. In particular, the sensor front end incorporates a pulse signal source that provides a pulsed first signal to a dual mode mixer. The dual mode mixer transmits a portion of pulsed first signal to be transmitted from the antenna as the sensor signal. The dual mode mixer further uses a portion of the pulsed first signal as a local oscillator to down convert the received reflected signal by mixing the pulsed first signal therewith to form a baseband video signal. These down converted signals are then processed and provided as a sensor output signal. Thus, an object will only be detected if the pulsed first signal and the reflected signal are present concurrently in the dual mode mixer. Thus, to be detected an object must have a range such that the total propagation time to and from the object is less than the pulsewidth of the signal provided by the pulsed oscillator.

Figure 1:
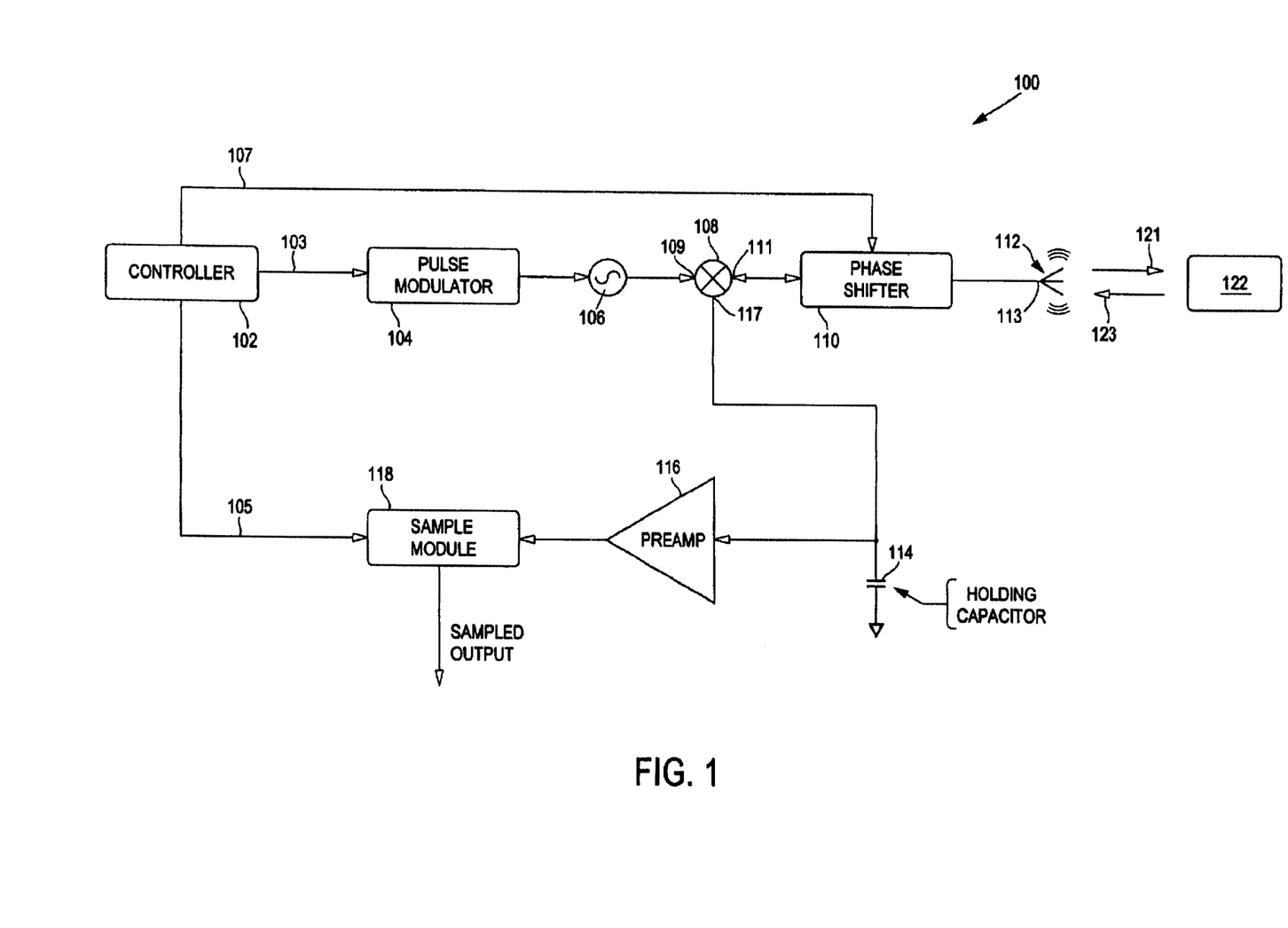
FIG. 1 is a block diagram of one embodiment of the sensor front end for velocity measurement.
Figure 2:
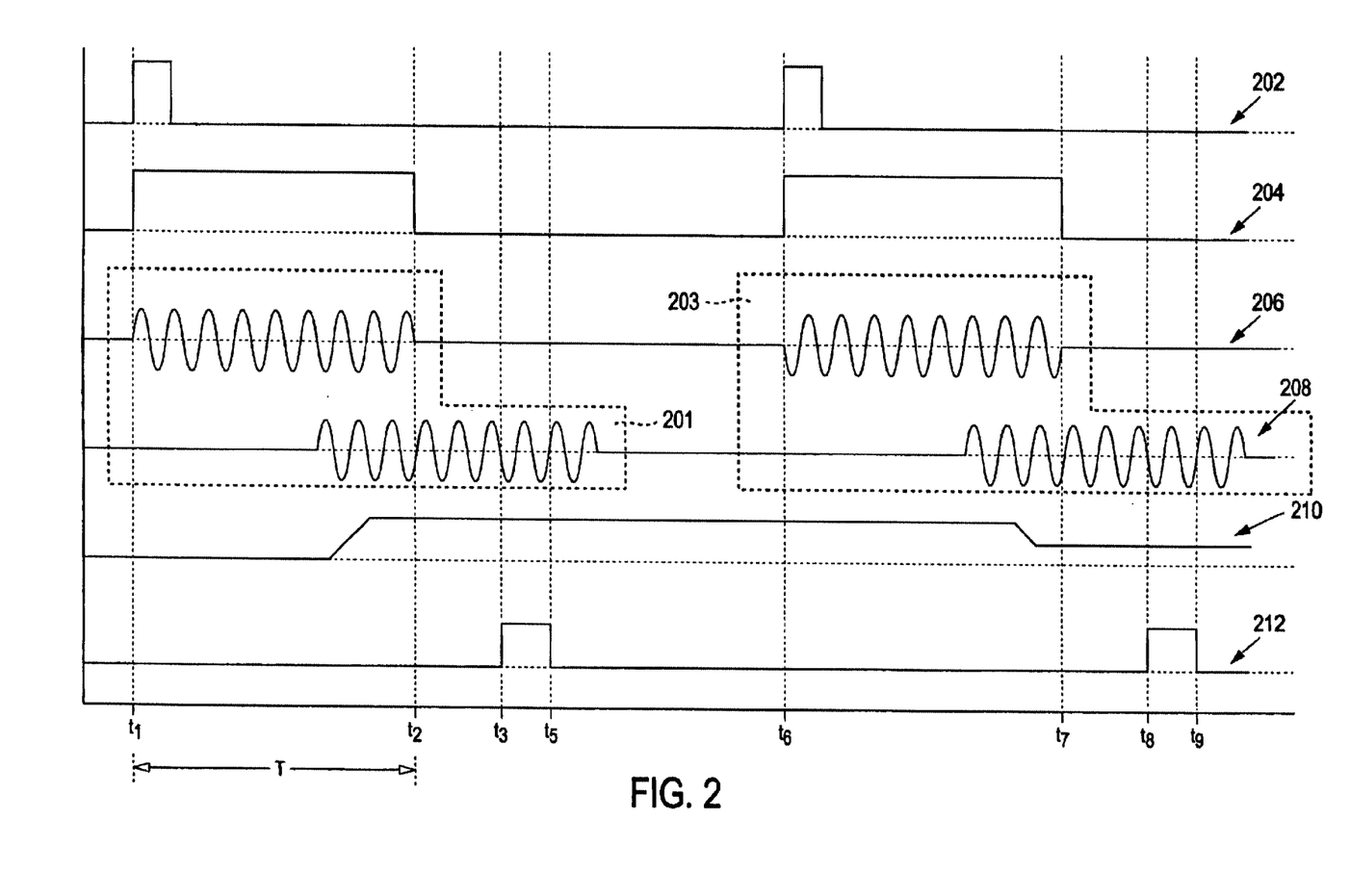
FIG. 2 is a timing diagram of various waveforms used in the embodiment depicted in FIG. 1.
Figure 3:
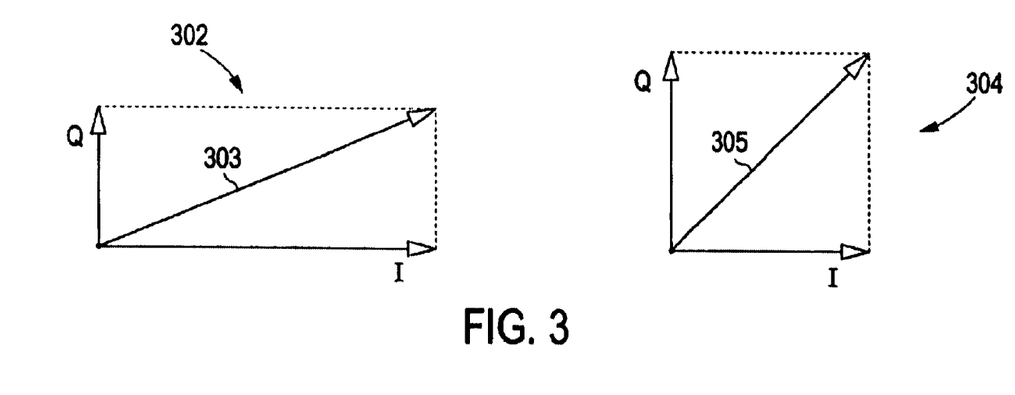
FIG. 3 is a graphical representation of the position vectors for IQ channels as depicted in FIG. 1.

FIGS. 1–3 depict the basic architecture and operation of the sensor front end, and FIGS. 4A, 4B, 4C, 5, and 6, depict circuits that are suitable for use within the embodiment depicted in FIG. 1. FIG. 7, depicts another embodiment of the sensor front end which is also able to utilitize the circuits depicted in FIGS. 4A–6.

Turning to FIG. 1, a sensor front end 100 includes a controller 102 that generates a plurality of control pulses, including a transmit trigger 103, a sample and hold pulse 105 and a phase control pulse 107. A pulse-modulator 104 receives the transmit trigger 103 and provides a gating function "on" pulse having a predetermined pulsewidth to pulse oscillator 106. The pulse oscillator 106 is responsive to the "on" pulse by providing a first signal for the time that the "on" pulse is active, i.e., for the predetermined pulsewidth. During the time that the "on" pulse is active, the first signal provided by the pulsed oscillator includes a first frequency, a first amplitude and a first phase. The transmit trigger 103 is provided with a predetermined pulse repetition frequency.

A dual mode mixer 108 is coupled to the pulsed oscillator 106 and receives the first signal at a first input port 109. As will be discussed in more detail below. The dual mode mixer 108 provides a predetermined amount of signal transmission between the first input port 109 and a first input/output port 111. Thus, a portion of the first signal is passed through the dual mode mixer 108 and is provided as an output at the first input/output port 111. The first input/output port 111 can be coupled directly to the antenna port 113, or preferably a phase shifter 110 can be inserted in series between the first input/output port 111 and the antenna port 113 as depicted in FIG. 1 The phase shifter 110 is configured and arranged to receive the phase control pulse 107 from the controller 102 and is responsive to the phase control pulse 107 by selectively shifting the phase of the transmitted first signal received from the dual mode mixer. Antenna 112 is a transmitting and receiving antenna having a common aperture for both transmitting the transmitted first signal as a sensor signal 121 and receiving a reflected signal 123 that has been reflected from an object 122.

When an object 122 is present within the beamwidth of the antenna 112, a portion of the sensor signal 121 is reflected therefrom and this reflected signal 123 is captured by the antenna 112. If used, the phase shifter 110 is configured and arranged to receive the phase control pulse 107 from the controller 102 and is responsive to the phase control pulse 107 by selectively shifting the phase of the reflected signal 123 received from the antenna 112. The dual mode mixer 108 receives the phase shifted reflected signal 123 from the phase shifter 110 and mixes the phase shifted reflected signal 123 with the first signal provided by the pulsed oscillator 106. Accordingly, mixing of the reflected signal 123 and the first signal will only occur during the time that the pulse modulator 104 provides the gated function "on" pulse to the pulsed oscillator. Therefore, the object 122 can be detected only if the reflected signal 123 is received and down converted during the time that the pulse modulator 104 provides the gated function "on" pulse to the pulsed oscillator. This will inherently allow objects to be discriminated based on their range from the antenna 112. Only objects that have a range in which the propagation of the sensor signal and the reflected signal is less than the predetermined pulsewidth of the gate function "on" pulse will be detected. Thus the detection range can be set as:

$$R_d \leq \frac{c}{2} * \tau_w \qquad \text{Eq. 1}$$

where c is the speed of light and $\tau_w$ is the predetermined pulsewidth of the gate function "on" pulse. Objects that are outside this range will not be detected.

The dual mode mixer 108 provides the signal obtained from the mixing operation of the first signal and the reflected signal 123 ("the mixed signal") as an output from a first output port 117. The hold capacitor 114 receives and stores the mixed signal that is provided during the duration of the gate function "on" pulse. A preamplifier 116 is coupled across the hold amplifier such that, the signal on the hold capacitor is amplified by the preamplifier 116 and is then provided to a sample module 118. The sample module 118 is configured and arranged to receive a sample pulse 105 and is responsive to the sample pulse 105 by providing a sampled output signal that is representative of the output of the preamplifier 116 at the time of the sample pulse 105. This sampled output may be provided to an analog-to-digital converter.

As discussed above, in a preferred embodiment a phase shifter 110 is used to selectively shift the phase of one or both of first signal received from the dual mode mixer 108 and the reflected signal 123 received from the antenna 112. The phase shifter preferably provides a total of ninety (90) degrees of phase shift between the first signal and the reflected signal provided to the dual mode mixer 108. This may be accomplished by shifting both the transmitted and received signals by forty-five (45) degrees, or by shifting one of the two signals by ninety (90) degrees.

Providing a total of ninety (90) degrees phase difference between the first signal and the reflected signal provided to the dual mode mixer 108 is referred to as in-phase and quadrature-phase signaling ("I/Q signaling"). I/Q signaling is used to provide an increased probability in detecting objects within the specified range. Transmission of the reflected signal 123 from an object 122 that is stationary, or maintaining a constant range if the antenna is moving can be represented as:

$$E_{return} = A\cos\left(2\pi f_0 t + \frac{2(2\pi R_0)}{\lambda}\right) \quad \text{Eq. 2}$$

where A is a constant, $f_0$ is the frequency, t is the time, $R_0$ is the range to the object, and the term $$\frac{2(2\pi R_0)}{\lambda} \quad \text{Eq. 3}$$

is a phase shift resulting from the two-way travel of the sensor signal 121 from the antenna 112 to the object 122 and the reflected signal 123 from the object 122 to the antenna 112. The operation of the dual mode mixer provides a result that is a non-linear multiplication of the sinusoidal first signal and the reflected signal 123 and the output of the mixer is:

$$E_{mixer} = B\cos\left(\frac{4\pi R_0}{\lambda}\right) \quad \text{Eq. 4}$$

where B is a constant associated with the strength of the received signal 123, $R_0$ is the range to the object, and $\lambda$ is the wavelength of the signal. Clearly, when the range $R_0$ is an integer multiple of $\lambda/8$ the output signal from the dual mode mixer 108 will be zero and an object that is stationary or maintaining a constant position to the moving antenna will not be detected. I/Q signaling circumvents this problem by the use of a second signal, the Q signal, that is orthogonal, i.e., ninety (90) degrees out of phase with the first signal, i.e., the I signal. Accordingly an object that has a range that satisfies Eq. 4 will be detected by the orthogonal Q signal. Thus, the position of an object can be determined in the I/Q space, wherein each of the two orthogonal I and Q signals represent position vectors in an I/Q orthogonal vector space. The vector that results from the addition of these two signal vectors represents a position vector to the object for the time period of the two measurements.

FIG. 2 depicts a variety of waveforms that illustrate the operation of the sensor front end 100 depicted in FIG. 1. In particular waveform 202 represents the transmit trigger 103 provided by controller 102. In the waveform depicted in FIG. 2, the rising edge of the transmit pulse 103 is provided at t1 to the transmit modulator 104. Waveform 204 represents the pulse modulation gate function "on" pulse having a predetermined pulsewidth "T". The pulsed oscillator 106 receives the pulse modulator pulse and provides the first signal that is oscillating at the first frequency, has the first phase, and has the first amplitude for the duration of the predetermined pulsewidth. If an object 122 is within the beam width of the antenna 112, energy will be reflected therefrom and received as a reflected signal 123 that is attenuated and time-delayed from the sensor signal as illustrated in waveform 208. This received reflected signal is down converted by the dual mode mixer 108 into a base band video level as depicted in waveform 210. The controller 102 provides a sample trigger pulse as illustrated in waveform 210 to sample the base band video level prior to the next pulse being generated. Alternatively, if a single pulse does not contain sufficient energy to charge the holding capacitor, several pulses may be received prior to the sample trigger pulse being provided to ensure that the holding capacitor has a sufficiently large charge to allow for proper operation.

As described above, preferably I/Q signaling is used in the sensor front end. As depicted in FIG. 2 the first set of waveforms 201 are referred to as in-phase, I, signals and the waveforms illustrated in 203 represent the quadrature-phase, Q, signals. As above, waveform 202 illustrates a transmit trigger pulse. A transmit pulse modulator pulse illustrated in waveform 204 is the predetermined pulsewidth and is received by the pulse oscillator. In this instance however, the phase shifter shifts the signal by ninety degrees and so provides a signal that is 90 degrees out of phase with the "in phase" signal provided earlier. The quadrature phase signal is provided for the duration of the transmitter pulse as illustrated in waveform 206. A received energy provides waveform 208 which is then down converted to a video base band level as illustrated in waveform 210 to be sampled at a sample trigger time as illustrated in waveform 212.

As discussed above, the signal amplitudes of both the in phase and quadrature phase channels constitute the measurements of a single position of the object and may be represented by a vector in the IQ signal space as illustrated in FIG. 3. In the illustration depicted in FIG. 3 a first position vector 302 is illustrated in which the I position vector is considerably greater than the Q position vector to determine a first position according to the resultant vector 303. A second position vector 304 includes in phase and quadrature position vectors of roughly equal magnitudes and a different position as illustrated by the resultant vector 305. Thus, ideally, position vector data may be obtained in four cycles of the pulse repetition frequency as illustrated in FIG. 2 wherein a first measurement is made for a first in phase measurement followed by a first quadrature measurement followed by a second in phase measurement followed by a second quadrature measurement. Because the position vectors represent the change in phase of the object at two discreet time intervals, the Doppler frequency, which is proportional to the closing rate between the sensor and the object, may be calculated using the equation:

$$f_d = \frac{1}{2\pi}\frac{d\phi}{dt} \approx \frac{1}{2\pi}\frac{\left(\arctan\left(\frac{A_q}{A_i}\right)_2 - \arctan\left(\frac{A_q}{A_i}\right)_1\right)}{(t_2 - t_1)} \quad \text{Eq. 5}$$

where, $A_i$ and $A_q$ are the amplitude of the individual components of the position vectors.

The closing rate accuracy as determined by the above equation, degrades proportionally to the measurement accuracy ambiguity of the amplitude of the individual components of the position vectors, and also due to low values of signal-to-noise ratio. An ambiguity in closing rate may result such that the position vector phase shift, from which the closing rate is calculated at depicted in equation 5 above, is obtained using data that contains a modulus "$2\pi$". This condition may occur under conditions such as when an extremely high closing rate exists, or if significant elapsed time occurred between measurement samples. Thus the ambiguity may be avoided by completing the data acquisition time, i.e., the time between subsequent position vector measurements, within one period of the Doppler cycle. Amplitude or range ambiguities or both may be avoided by eliminating object returns from objects outside specific range limits. As discussed above, the discrimination of objects that are beyond the desired range is accomplished by limiting the total propagation time, i.e., the two way range from sensor to object to be less than the pulse modulator gate function "on" pulse pulsewidth. In this way the dual mode mixer 108 will convert the reflected signal to a base band video signal, wherein the base band video signal will have an amplitude that is proportional to the signal strength and phase of the received signal where the phase is relative to the phase of the pulse oscillator signal. As such, only objects within the specified range will be detected.

In one embodiment that can be used with an automobile sensing system various system parameters such as the transmitter pulsewidth, the pulse repetition frequency, the hold capacitance, the video bandwidth, and I and Q sample time will be discussed. For one embodiment of an automobile system, Table 1 contains possible measurement requirements for a seatbelt pre-tensioning system.

TABLE 1

| Parameter | Requirement |
| --- | --- |
| Range: | 0 ≤ R ≥ 5.0 meters |
| Velocity: | 0 ≤ R ≥ 200 km/hr |
| Velocity Accuracy: | 5.0%, maximum |
| Data Acquisition Time: | 1.0 msec, maximum |

At a closing rate of 200 km/hr, the range change in 1.0 millisecond is 0.055 meters, and the time to impact is 0.09 seconds. The pulse modulator gate function "on" pulse pulsewidth for a maximum detection range of 5 meters is 33.33 nanoseconds.

The velocity measurement limit is determined by the ability to acquire and process the position vector data within the data acquisition time of 1 millisecond. To ensure the detection of objects at the maximum detection range of 5 meters the pulsewidth must be extended so that a sufficient time overlap occurs between the transmitted and received signals. For a video bandwidth that is sufficiently broad, i.e., capable of charging the hold capacitance during a single pulse repetition frequency cycle, the position vector data may be obtained in four cycles of the pulse repetition frequency. An object at a range of 5 meters will produce a 17 nanosecond overlap and as such the required video bandwidth, neglecting delay may be shown to be 23 megahertz. If the pulse repetition frequency is 1 megahertz, the required time for the acquisition of the position vector data is 4 microseconds.

To determine the Doppler frequency unambiguously, the maximum change in the two way phase is $2\pi$ radians and for a data acquisition period of 4 microseconds, the maximum velocity is 1554 m/sec. It is unlikely that such a high velocity will be encountered in an automotive system. A tradeoff can be made between reducing the bandwidth to facilitate a greater probability of detection and the measurement accuracy. Thus, for a maximum velocity of 250 km/hr, the minimum acquisition time is approximately 90 microseconds. Therefore, at a pulse repetition frequency of 1 megahertz approximately 20 samples could be utilized for each of the four components of the two position vectors, or the video band may be reduced by a factor of 20 with respect to the single pulse acquisition. Further, the radar range equation may be used to approximate the operational detection range under the following parametric conditions:

$$R_{max} = \sqrt[4]{\left(\frac{P_t G_t G_r \lambda^2 \sigma}{(4\pi)^3 F_s k T B_n \alpha}\right)} \quad \text{Eq. 6}$$

where $P_t$ is the transmitter power (0.001 Watts), $G_t$ is the transmit antenna gain (10), $G_r$ is the receive antenna gain (10), $\lambda$ is the operating wavelength (0.0124 meters), $F_s$ is the front end noise figure (10), $\sigma$ is the object radar cross section (5 square meters), T is the absolute temperature in Kelvins (300 °K), k is Boltzmann's constant ($1.38*10^{-23}$ J/K), $\alpha$ is the required detection signal to noise ratio (30), and $B_n$ is the system noise bandwidth (5.0 MHz). For these system parameters Eq. 6 shows a operational detection range of approximately 8.8 meters, and a signal to noise ratio of approximately 24.7 dB at 5.0 meters. Other applications that may be used with this system include a perimeter security system and an electronic fence.

Figure 4A:
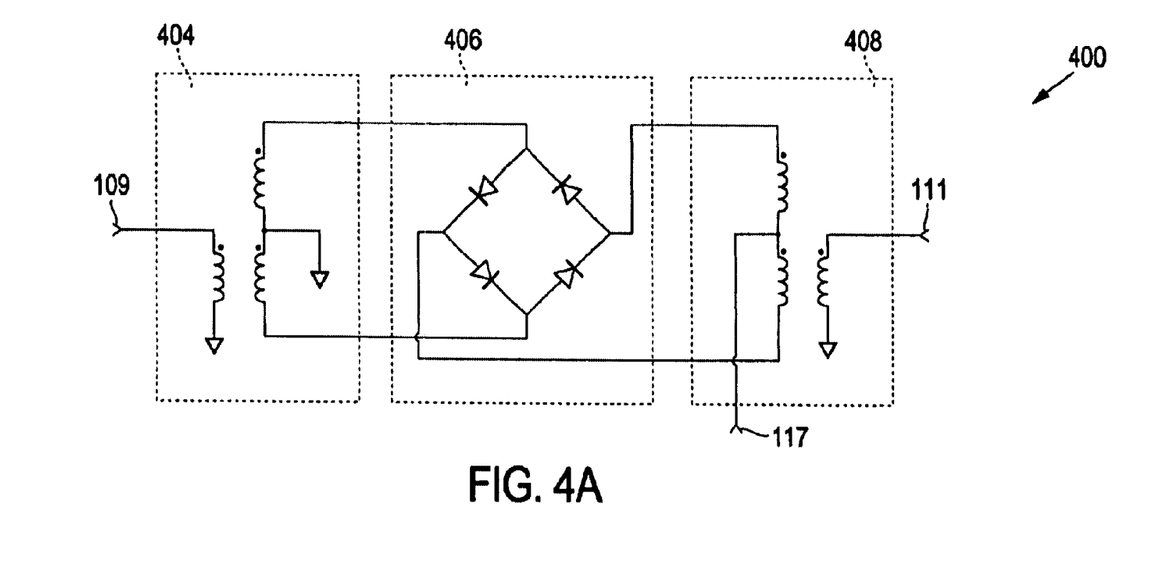
FIG. 4a is one embodiment of a mixer suitable for use in the present invention.
Figure 4B:
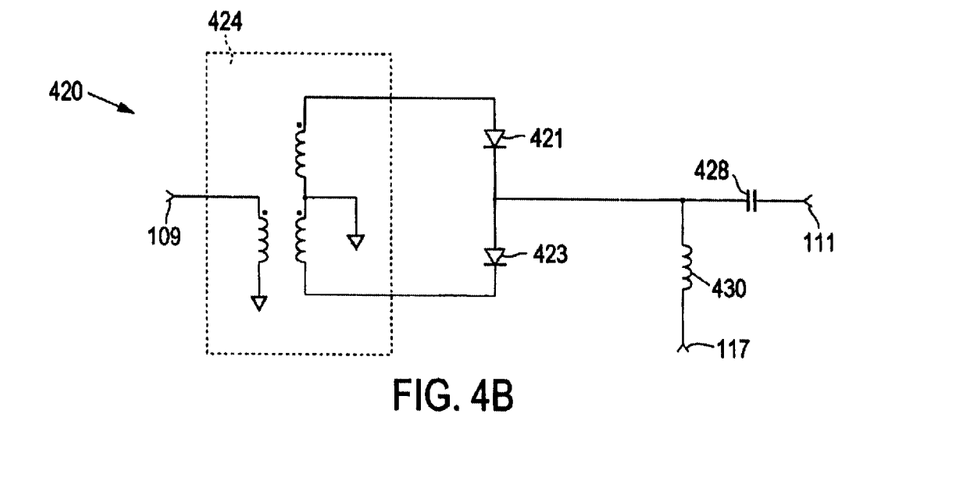
FIG. 4b is another embodiment of a mixer suitable for use in the present invention.
Figure 4C:
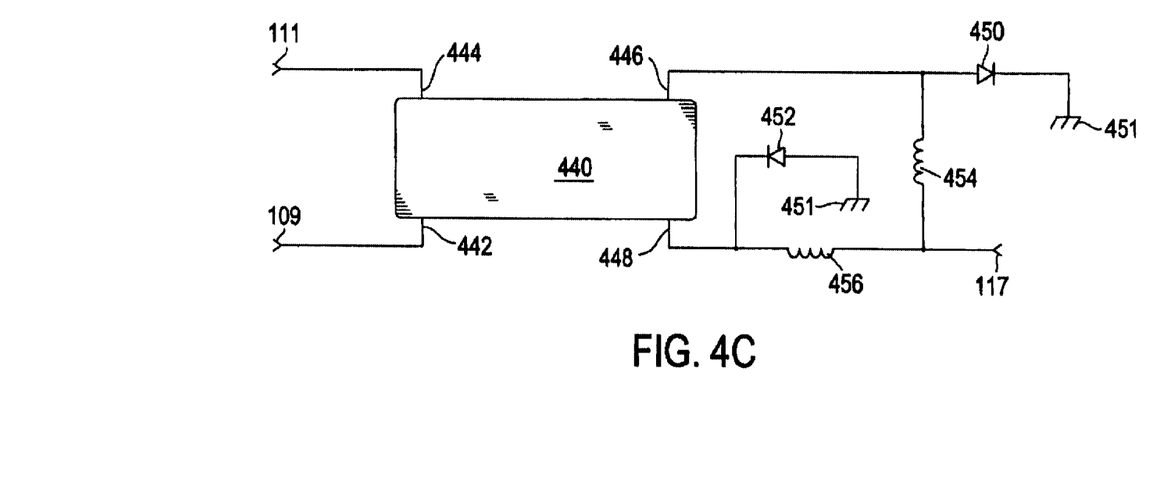
FIG. 4c is another embodiment of a mixer suitable for use in the present invention.

FIGS. 4A, 4B, and 4C depict three embodiments of dual mode mixers that are suitable for use in the sensor front end 100 depicted in FIG. 1. FIG. 4A is a double balanced mixer ("DBM") 400 that includes first and second baluns 404 and 408 respectively and a quad diode ring 406.

FIG. 4B depicts another embodiment of a dual mode mixer suitable for use in the sensor front end depicted in FIG. 1. Mixer 420 is a single balanced mixer. The single balanced mixer 420 has intrinsic isolation between the first input port 109 and the first input/output port 111 by the null associated with the bipolar drive signal, from balun 424, across diodes 421 and 423. Inductor 430 is provided to prevent RF energy from the first input/output port 111 from entering the first output port 117. Capacitor 428 is added to prevent the down-converted baseband video signal from transmitting through the first input/output port 117.

FIG. 4C depicts a quadarature hybrid mixer 440 that can act as a dual mode mixer suitable for use in the sensor front end depicted in FIG. 1. Quadrature hybrids are devices that divide an input signal at one terminal into two signals that are output on the terminals on the opposite side of the hybrid. The two output signals typically have one-half the power of the input signal and are ninety (90) degrees out of phase with one another. Any port may be used as the input port, with the other ports responding according to the known properties of quadrature hybrids. In this way, a quadrature hybrid may be used during transmission due to the signal that is passed between the ports and during reception as a mixer since the local oscillator and the incoming signal will each be provided to the output ports for mixing using an appropriate mixer diode.

As depicted in FIG. 4C the quadrature hybrid 440 includes a first port 442, typically referred to as local oscillator input, that receives the first signal 109. The quadrature hybrid 440 further includes a second port 444 that is coupled to the phase shifter 110 and provides or receives signal 111 to and from the phase shifter 110 respectively. Ports 446 and 448 are coupled to mixer diodes 450 and 452 respectively that are coupled to ground 451 Ports 446 and 448 are further coupled, via inductors 454 and 456 respectively to signal the holding capacitor 114 and provide signal 117 thereto.

Figure 5:
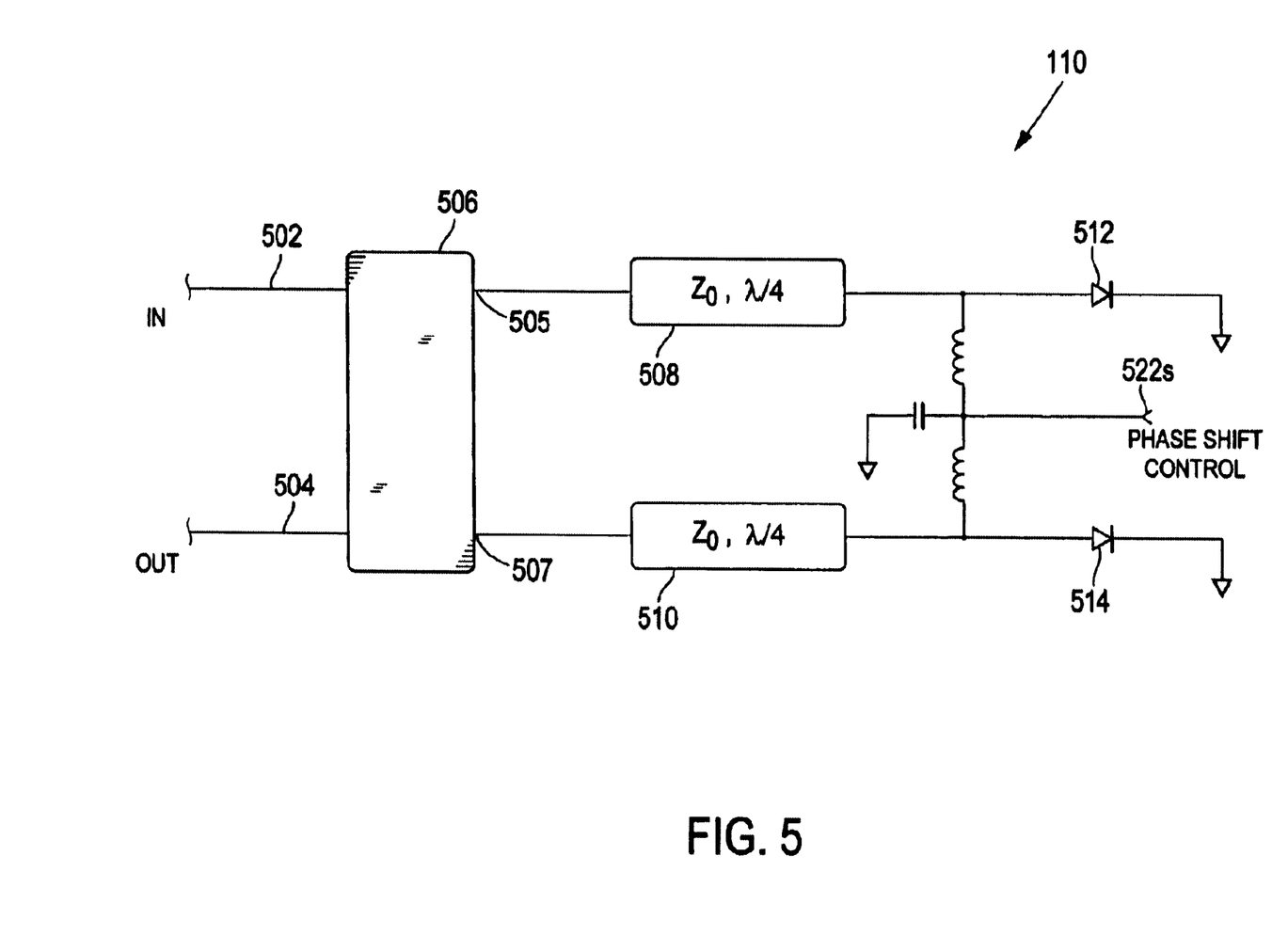
FIG. 5 is a schematic diagram of a phase shifter circuit suitable for use in the present invention.

FIG. 5 depicts one embodiment of a phase shifter 110 suitable for use with the sensor front end described herein. Phase shifter 110 includes a quadrature hybrid 506 that has four terminals, 502, 504, 505, and 507, wherein terminal 502 is arbitrarily set as the input terminal. As discussed above, quadrature hybrids are devices that divide an input signal at one terminal into two signals that are output on the terminals on the opposite side of the hybrid. The two output signals typically have one-half the power of the input signal and are ninety (90) degrees out of phase with one another. In the illustrated embodiment, a signal input at terminal 502 will be divided and phase shifted between terminals 505 and 507. If a signal is input at terminal 502 any reflections present at terminals 505 and 507 will be propagated through the hybrid and will be output at terminals 502 and 504. As such, the impedance and reflectivity of any transmission line or circuit elements coupled to the terminals 505 and 507 can cause reflections back into the quadrature hybrid 506 and provide a phase shifted version of the signal input at terminal 502 as an output at terminal 504. Transmission lines 508 and 510 are a quarter wavelength at the frequency of interest and will act as impedance transformers for the terminating impedances. The phase shift control signal is input to terminal 522 and will act to turn on or off the pin diodes 512 and 514. When on the PIN diodes will short the terminal end of the quarter wavelength transmission lines 508 and 510 to ground resulting in a reflectivity of 1 and a nearly infinite impedance at the input to the two transmission lines. In the event that the PIN diodes 512 and 514 are turned off, the parasitic reactance of the PIN diodes in an "off" state will be transformed by the quarter wavelength transmission lines 508 and 510 respectively.

Figure 6:
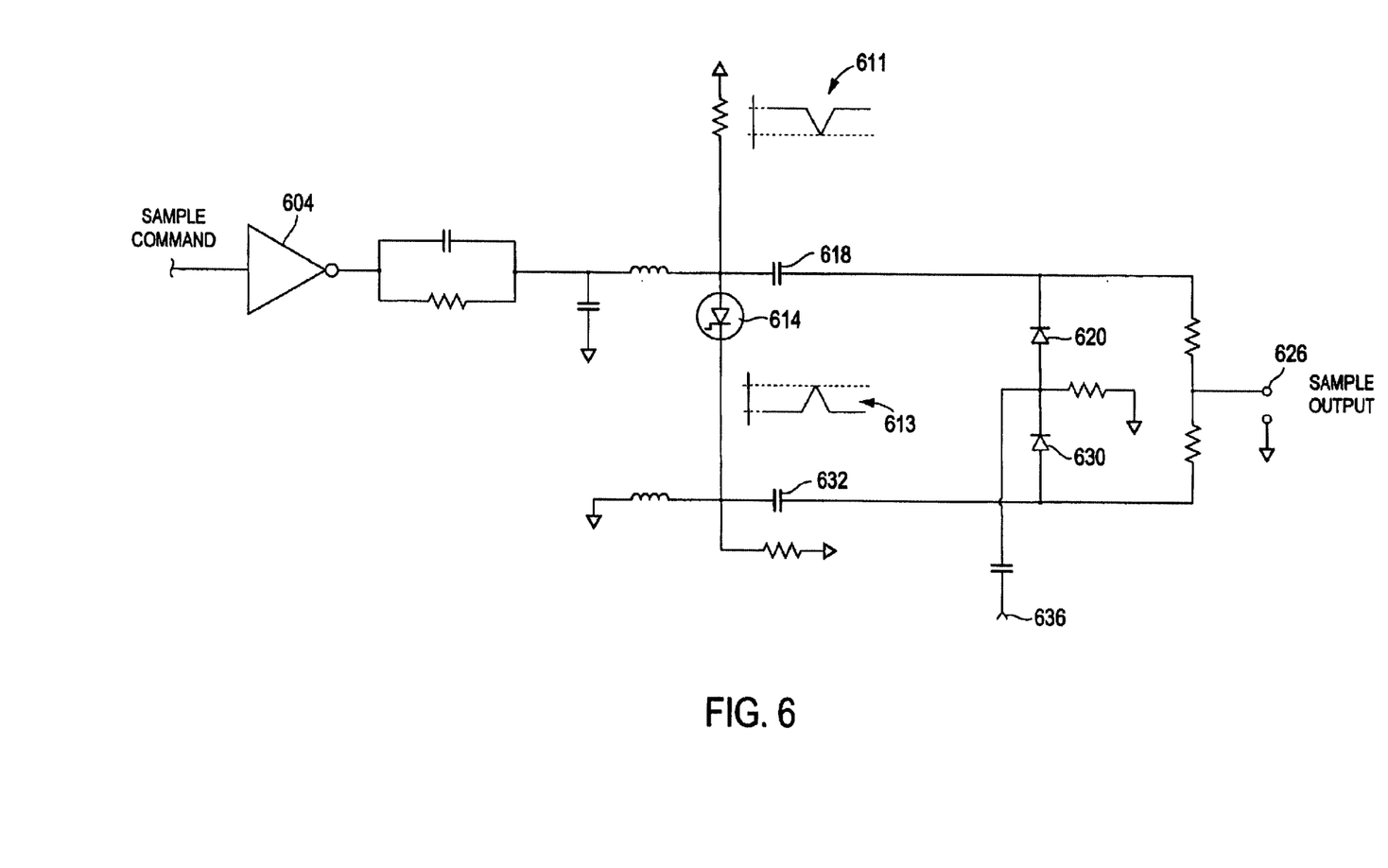
FIG. 6 is a schematic diagram of a sampler module suitable for use in the present invention.
Figure 7:
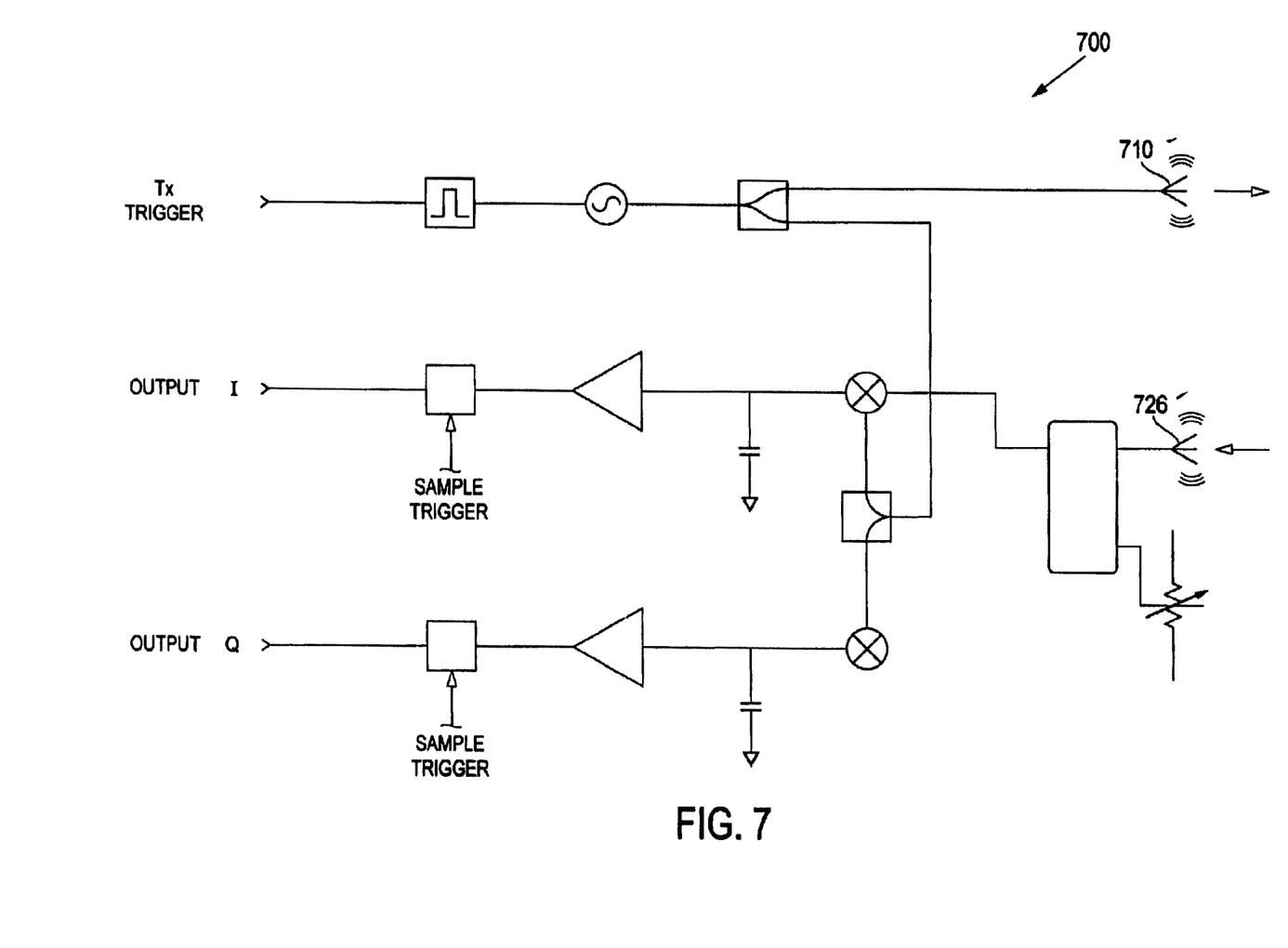
FIG. 7 is a block diagram of another embodiment of the sensor front end for velocity measurement.

FIG. 6 depicts a broad band sampling circuit suitable for use with the sensor front end depicted in FIG. 1. The circuit depicted in FIG. 6 utilizes high speed bi-polar sampling pulses 611 and 613 to rapidly turn on and off diodes 620 and 630 to sample the signal present at input 636 and provide a sampled output at node 626. A pulse generator suitable for generating the high speed sampling pulses 611 and 613 includes a step recovery diode (SRD) 614, which has a very rapid transition time, i.e., a SRD will rapidly switch from a conducting to a non-conducting state when a reverse bias is applied. As the drive signal from driver 604 falls, the SRD will switch off and the fast negative going pulse is provided to the capacitors 618 and 632 that will differentiate the negative going pulse and provide the pulses 611 and 613.

FIG. 7 depicts an alternative architecture for the sensor front end. In particular, the sensor front end 700 includes separate in phase and quadrature phase channels in order to permit the acquisition of I and Q signal components simultaneously. This embodiment utilizes matched amplitude and quadrature phase channels with separate transmitter antenna 710 and receives antenna 726. In this embodiment a phase shifter is not required. Also by simultaneously acquiring the I and Q channel data faster acquisition of the position vectors with less intrinsic error due to object motion during the time between I and Q measurement is eliminated. In addition, higher transmitter power may be utilized because a transmission signal is not required to establish the transmitter power level as with the embodiment depicted in FIG. 1. The methodology of acquiring samples is the same as depicted in FIG. 2 and FIG. 3 and the circuits illustrated in. FIGS. 4A–6 can be used as component circuits in the embodiment depicted in FIG. 7. Because the higher transmitter power can be used, greater range detection can be provided and an increase in the signal to noise ratio at the specified range of 5 meters can also be provided.

As discussed above, range discrimination is a function of the transmitter pulsewidth. For the embodiments depicted in FIGS. 1–7 the transmitter pulsewidth can be changed to investigate specific range cells. For example, a short pulse commensurate with short range can be initially employed for close ranges such that objects nearer the sensor can be detected first. As the pulse width is increased, progressively larger range cells will fall within the object detection range so that objects at specific ranges can be discriminated and a more precise determination of object range performed.

Those of ordinary skill in the art should further appreciate that variations to and modification of the above-described methods and apparatus for a sensor front end. Accordingly, the invention should be viewed as limited solely by the scope and spirit of the appended claims.

What is claimed is:

1. A sensor front end for discriminating an object based on range, the sensor comprising:

an antenna having a common aperture for transmitting a sensor signal and receiving a reflected signal;

a first signal module configured and arranged to provide a first signal having a predetermined duration;

a mixer module coupled to the first signal module and to the antenna, wherein a portion of the first signal is passed by the mixer to the antenna and transmitted from the antenna, and wherein in the event that the object is present, receiving a reflected signal from the object via the antenna;

a phase shifter coupled between the mixer and the antenna; and wherein the mixer is configured and arranged so that the first signal and the received reflected signal provides a mixed signal output when the received reflected signal and a portion of the first signal are present concurrently in the mixer.

2. The sensor front end of claim 1 wherein:

the phase shifter includes a first port and a second port, the second port coupled to the antenna, and the phase shifter is configured and arranged to selectively shift the phase of a reflected signal received at the second port from the antenna and to provide as an output from the first port a phase shifted reflected signal;

and wherein the first signal module includes a pulsed signal source providing a pulsed first signal having a predetermined signal duration and having a predetermined pulse repetition frequency, the first signal having a first frequency and a first phase;

and wherein the mixer module includes a dual mode mixer having first, second, and third ports, the first port of the dual mode mixer coupled to the pulsed signal source and receiving the first signal therefrom, the second port of the dual mode mixer coupled to the first port of the phase shifter, the dual mode mixer configured and arranged to transmit a portion of the first signal from the first port to the second port and to provide the transmitted portion of the first signal as an output from the second port, and wherein the phase shifter receiving the transmitted portion of the first signal at the first port and the phase shifter for these configured and arranged to selectively shift the phase of the transmitted portion of the first signal and to provide as an output from the second port a transmitted phase shifted first signal;

the antenna receiving the transmitted phase shifted first signal and transmitting the transmitted phase shifted first signal as the sensor signal, in the event that the object is present, the antenna receiving the reflected signal therefrom and providing the reflected signal to the second port of the phase shifter;

the phase shifter receiving the reflected signal at the second port and the phase shifter configured and arranged to selectively shift the phase of the reflected signal and to provide as an output from the first port a phase shifted reflected signal;

the dual mode mixers receiving the phase shifted reflected signal at the second port, the dual mode mixer configured and arranged to mix the phase shifted reflected signal with the pulsed first signal provided by the pulsed signal source and to provide the mixed signal as an output from the third port;

a receiver having an input coupled to the third port of the dual mode mixer and an output providing indication of the presence and non-presence of the object; and whereby the mixed signal will be provided, and the object detected, only if the object has a range that is less than one half the predetermined signal duration multiplied by the speed of light such that the phase shifted reflected signal is present at the dual mode mixer concurrently with at least a portion of the pulsed first signal.

3. The sensor front end of claim 2 wherein the phase shifter selectively provides a total of ninety (90) degrees of phase shift between the transmitted portion of the first signal and the reflected signal such that in phase and quadrature phase signals are formed.

4. The sensor front end of claim 3 wherein the phase shifter selectively provides a phase shift of forty-five (45) degrees of phase shift to the transmitted portion of the first signal and forty-five (45) degrees of phase shift to the reflected signal.

5. The sensor front end of claim 3 wherein the phase shifter selectively provides a phase shift of ninety (90) degrees to the transmitted portion of the first signal and zero (0) degrees of phase shift to the reflected signal.

6. The sensor front end of claim 3 wherein the phase shifter selectively provides a phase shift of ninety (90) degrees to the reflected signal and zero (0) degrees of phase shift to the transmitted portion of the first signal.

7. The sensor front end of claim 2 wherein the pulsed signal source includes a pulse modulator providing a pulse modulation signal having the predetermined signal duration and the pulse repetition frequency and an oscillator coupled to the pulse modulator and responsive to the pulse modulation signal by providing the first signal for the predetermined duration of the pulse modulation signal.

8. The sensor front end of claim 2 wherein the dual mode mixer is a double balanced mixer.

9. The sensor front end of claim 2 wherein the dual mode mixer is a single balanced mixer.

10. The sensor front end of claim 2 wherein the dual mode mixer is a quadrature hybrid mixer.

11. The sensor front end of claim 2 wherein the receiver includes:

a holding capacitor coupled between the third port of the dual mode mixer and a voltage reference node, wherein the holding capacitor stores at least a portion of the mixed signal;

a preamplifier coupled to the holding capacitor and providing as an output a preamplified mixed signal;

a sample module coupled to the preamplifier and configured and arranged to sample the preamplified mixed signal and to provide the sampled preamplified mixed signal as a sensor output signal.

12. The sensor front end of claim 11 further comprising a signal processing module coupled to the sample module to receive the sensor output signal and to provide as an output a signal indicative of the position of the object.

13. The sensor front end of claim 12 wherein the signal processing module provides as a second output a signal indicative of the velocity of the object.

14. The sensor front end of claim 2 wherein the first frequency is in the microwave range.

15. The sensor front end of claim 2 wherein the first frequency is in the millimeter wave range.

16. A method of discriminating an object based on range comprising the steps of:

providing a pulsed first signal having a predetermined duration;

transmitting the pulsed first signal from an antenna in the event the object is present;

receiving a reflected signal from the object;

processing the received reflected signal through a phase shifter; and providing the pulsed first signal and the received phase shifted reflected signal to a mixer such that the mixer provides a mixed signal output when the received phase shifted reflected signal and a portion of the pulsed first signal are presently concurrently in the mixer.

* * * * *